United States Patent [19]

Teyssedre

[11] 4,069,764
[45] Jan. 24, 1978

[54] MANUFACTURING PRODUCTION LINE AND METHOD

[75] Inventor: Jean-Pierre Teyssedre, Bretigny-sur-Orge, France

[73] Assignee: Regie Nationale des Usines Renault, France

[21] Appl. No.: 607,633

[22] Filed: Aug. 25, 1975

Related U.S. Application Data

[63] Continuation-in-part of Ser. No. 560,262, March 19, 1975, abandoned.

[30] Foreign Application Priority Data

Mar. 28, 1974 France .............................. 74 10841

[51] Int. Cl.² .......................................... B61B 13/00
[52] U.S. Cl. ............................... 104/88; 29/430; 104/172 S; 104/249; 198/339; 198/344; 210/164
[58] Field of Search ............... 104/88, 172 S, 249, 104/250, 251; 29/33 P, 430; 198/19, 38, 339, 344, 346, 348; 211/115, 131, 162; 269/71; 248/324; 105/156; 404/2, 4, 5; 210/163, 164; 61/10; 52/21

[56] References Cited

U.S. PATENT DOCUMENTS

| | | | |
|---|---|---|---|
| 2,902,945 | 9/1959 | Simon | 104/88 |
| 2,940,400 | 6/1960 | Harrison | 104/88 |
| 2,979,181 | 4/1961 | Abbey | 198/19 |
| 2,988,012 | 6/1961 | Markley et al. | 211/162 X |
| 3,056,360 | 10/1962 | Burmeister et al. | 104/172 S X |
| 3,355,162 | 11/1967 | Kerr | 269/71 |
| 3,538,863 | 11/1970 | Howard et al. | 211/131 X |
| 3,610,159 | 10/1971 | Fickenscher | 104/88 |
| 3,673,658 | 7/1972 | Hagen | 29/430 X |
| 3,722,425 | 3/1973 | Allen | 104/88 |
| 3,927,760 | 12/1975 | McCall | 105/156 X |

Primary Examiner—Robert J. Spar
Assistant Examiner—Randolph A. Reese
Attorney, Agent, or Firm—Beveridge, De Grandi, Kline & Lunsford

[57] ABSTRACT

Articles are manufactured on a production line including a plurality of independent work supporting and handling elements supported for movement along a conveying line connected to a plurality of stations for the individual treatment of an article. Each station includes at least two short treatment lines supplied with the handling elements by parallel branches of the conveying line, with the branches each being connected to a common discharge conveyor line, whereby each treatment line may receive a group of handling elements with the articles conveyed thereon receiving a plurality of operations at the stations while the articles are supported on the handling elements, with the group being moved from the branch lines after treatment of the entire group is completed.

6 Claims, 4 Drawing Figures

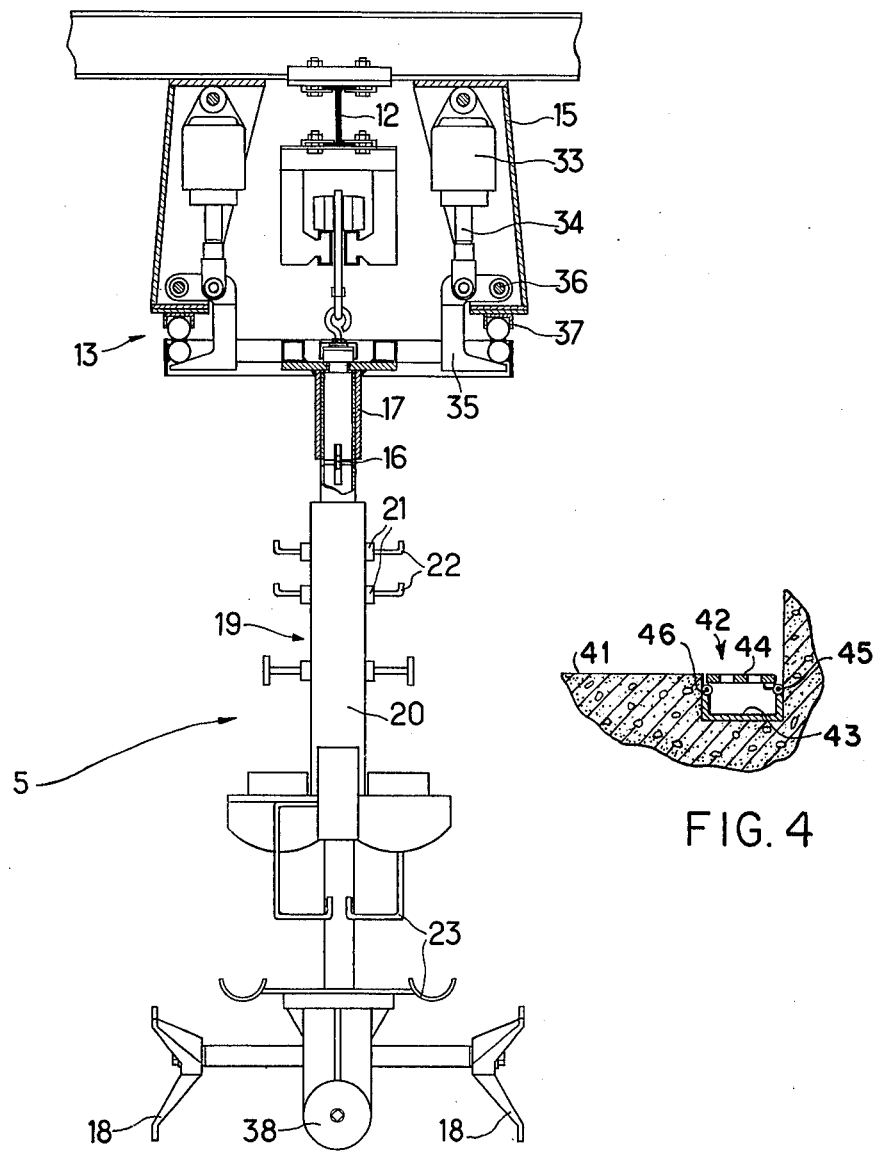

MANUFACTURING PRODUCTION LINE AND METHOD

REFERENCE TO RELATED APPLICATIONS

This is a continuation-in-part of my copending U.S. patent application Ser. No. 560,262, filed Mar. 19, 1975, now abandoned.

BACKGROUND OF THE INVENTION

1. Field of the Invention

This invention relates to improvements to production line installations for manufacturing articles in large or small series, and more particularly to the arrangement of the working stations and the devices and circuits supplying such stations and to a process for manufacturing articles on such a production line.

2. Description of the Prior Art

In large scale serial manufacture, conventional machining or assembly line installations are known which are formed by central transfer lines or conveyors on which the articles to be treated move successively in front of a series of working stations at each of which a worker performs an elementary treatment or assembly operation. The operations are performed either mechanically or manually. In the former case, their automation calls for heavy investments which are justified only by large scale serial production and obviates all versatility in their use. In the latter case, the repetitive nature of the jobs raises difficult human problems, inter alia in large scale serial manufacture at the numerous stations which have not yet been automated.

In all cases, production lines of this kind call for heavy investment in the supply means, such as the transfer conveyor systems and the means for equipping the numerous individual working stations. Moreover, manufacturing workshops having multiple and independent machines or individual working stations, such as are always used in unit or small scale serial production, require greater versatility to make such transfer systems economical, which versatility is normally accomplished only at the cost of greatly reduced productivity.

SUMMARY OF THE INVENTION

This invention combines the advantages of both manufacturing methods — i.e., versatility and productivity — without having the disadvantages of the conventional central transfer production lines as regards investment and working conditions.

According to the invention, the production line comprises a line of independent work handling elements which are guided, as a rule can be actuated manually, and each receive articles or assemblies of articles to be treated, the line being connected to a plurality of stations for the individual treatment of an article. Each of the stations comprise at least two short identical treatment lines supplied by parallel branches of guide rails or tracks and connected to a common evacuating or discharge conveyor line, each treatment line successively receiving a group of handling elements whose articles or groups of articles conveyed are treated simultaneously for a plurality of operations, directly on their handling elements.

The articles can be treated in a number of series of identical operations successively on each article in a treatment line, the number being limited to the number of articles in the treatment line, or simultaneously on each side of the line. Means for locking the handling elements on each treatment line can be provided to ensure that they are retained in position during the treatment of the articles.

The extra tools, materials, and parts or members which take up little space required for the treatment are advantageously disposed in a carriage movable along each treatment line. Preferably the carriage comprises a number of compartmented sectors pivoted around the vertical pivot and successively presenting themselves opposite the treatment zone, each sector containing the materials and tools needed for one or more successions of identical operations to be carried out on the treatment line. Each carriage preferably contains the materials and members required for at least one day of work.

The invention also relates to handling elements which are especially well adapted for use in a manufacturing production line according to the invention. The handling elements according to the invention each comprise means for supporting at least two articles to be treated disposed symmetrically on such elements, and an assembly having support means for two assemblies of members required for the treatment of the articles. The handling elements can advantageously pivot through 180° around their respective vertical axes, and the various operations can be performed successively on each row of articles or group of articles to be treated, from the same side of the line.

BRIEF DESCRIPTION OF THE DRAWINGS

A non-limitative embodiment of the invention, adapted to a typical case of production difficulties of the kind specified and consisting of an assembly line for engines rebuilt for standard interchange, comprising numerous types of different engines and highly irregular seasonal production requirements, will now be described with reference to the accompanying drawings, wherein:

FIG. 3 is a detailed elevational view of a handling element of pivoting conveying elements; and FIG. 4 is a fragmentary sectional view illustrating another feature of the invention.

DESCRIPTION OF THE PREFERRED EMBODIMENTS

Figure 1:
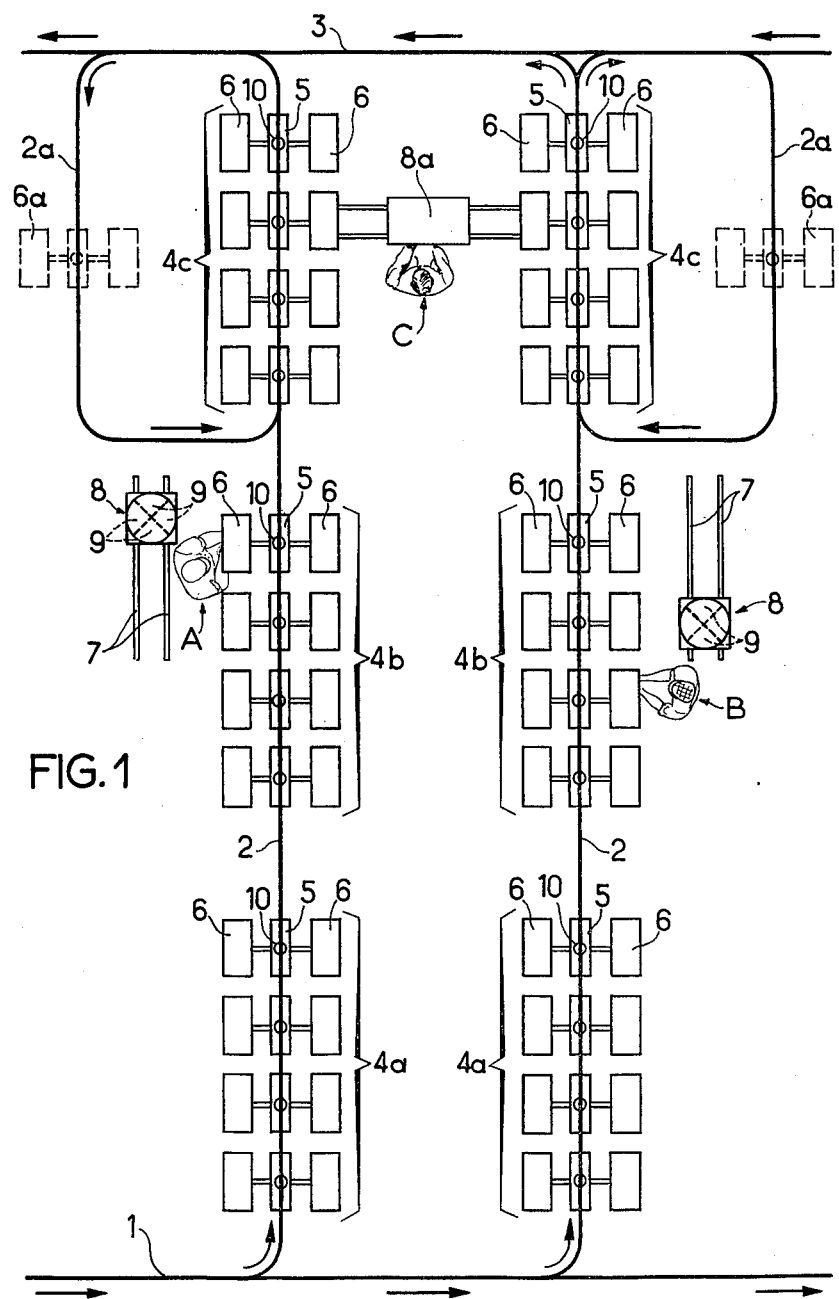
FIG. 1 is a plan view diagrammatically illustrating an engine assembly line, the engines being assembled in groups of two rows of four engines and handled in groups of two engines by a pivoting conveying device.

FIG. 1 shows the production or assembly line as comprising a supply line 1 connected to a plurality of individual treatment stations, only one of which is shown diagrammatically. The individual treatment stations comprise two short treatment lines 2 connected to an evacuating line 3. Each treatment line 2 is adapted to receive a first group 4a of four handling elements 5 in the standby position, a second group 4b of four handling elements 5 in the assembly position, and a third group 4c of four handling elements 5 in the test and checking position. The handling elements 5, suitably suspended from an overhead track or guide rail, are each formed by a pivoting conveying device comprising means enabling two engines 6 (shown diagrammatically) to be assembled and supported thereon.

The assembly location for each of the treatment lines 2 — i.e., the location opposite the group 4b of handling elements 5 — has guide rails 7 disposed respectively outside the individual assembly station formed by the lines 2 for supporting and allowing the displacement of a moving carriage 8 comprising four compartmented sectors 9 which can receive extra parts or members which do not take up much space, such as cylinder head gaskets, distributing members, bolts, etc., and the materials and tools required for assembling the main members which are supported by the pivoting conveying devices 5 as will be gathered hereinafter.

In a preferred embodiment, the conveying devices 5 are supported for pivotal movement around their vertical axes 10 in such a manner that two operators A and B can each successively proceed to assemble the eight engines supported by the conveying devices 5 after they have been rotated through 180° around their respective axes. Moreover, the operator can displace the moving carriage 8 as he wishes so that at all times the extra members and tools required are available opposite each of the engines to be assembled. Clearly, it is also possible for two operators placed on each side of a single line 2 to assemble simultaneously two engines mounted on the same conveying device, in which case the conveying device need not be pivoted.

In the embodiment illustrated, the group assembly stations are followed by a test, checking and running in station for the assembled engines. To this end, each line 2 is adapted to receive in succession to the group 4b a third group 4c of four handling elements. In the preferred embodiment, the distance apart of the lines 2 is such as to enable a single operator C to carry out tests on 16 engines, eight of which come from each group 4b of one line 2. A test bench 8a is conveniently disposed between the two lines 2. A return conveyor path 2a is provided following the test station of each line 2 outside the lines 2 to enable an engine 6a whose tests were unsatisfactory to be touched up or repaired at an adjacent work area and returned to the line 2 upstream of the test area for retesting as necessary.

Figure 2:
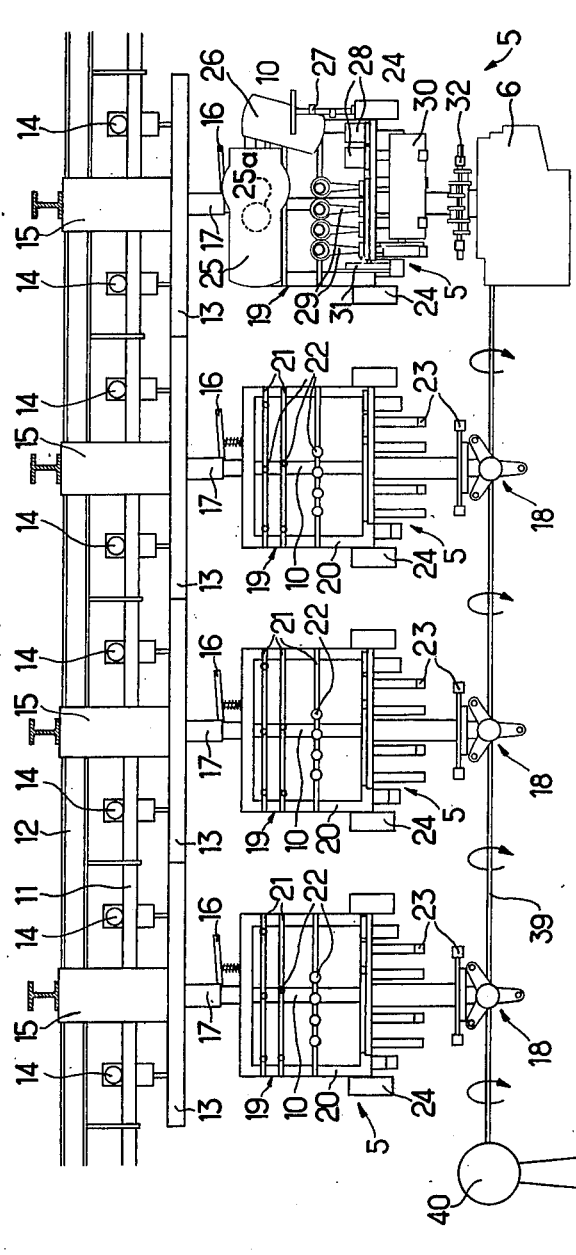
FIG. 2 illustrates diagrammatically in elevation the assembly zone, with the devices for locking and pivoting of the four pivoting conveying devices on which assembly is performed, only one of such devices having the main members to be assembled, so as not to overload the drawings.

FIG. 2 shows how the four pivoting conveying devices 5 for the group of engines to be assembled are suspended from an overhead guide rail or track 11 connected to an overhead framework 12. Each conveying device 5 comprises an upper frame 13 having rollers 14 which can move on the guide rail 11. Resilient bumpers or shock absorbing means can be provided on the frames 13 which contact one another. The treatment line comprises for each of the conveying devices 5 a pneumatic locking device 15 connected to the overhead framework 12 and then adapted, as will be seen hereinafter, to lift the frame 13 to retain the conveying device 5 in position during assembly.

Each pivoting conveying device 5 comprises a vertical shaft 10 around which it can pivot, the device 5 being locked in position by a manual lever 16 cooperating with a sleeve 17 connected to the upper frame 13, the shaft 10 rotating inside the sleeve 17. Mounted on the shaft 10 are two stellate supports 18 for the casing of the engines 6 to be assembled and an assembly 19, comprising a vertical generally rectangular frame 20 having on each of its faces supporting rods 21 having fingers 22 for supporting various main components required for the assembly of the engine. The assembly 19 can also comprise supporting feet 23 or baskets 24 adapted to support particular members or parts required for the assembly.

FIG. 2 therefore shows one of the pivoting conveying devices having a supply of assembly members supported by the assembly 19, including an oil casing 25 for the engine, a pump 25a, distributor casing 26, cam shaft 27 jackets 28, rods and pistons 29, cylinder head 30, flywheel 31, crank 32 and the complete transmission and a set of bearings (not shown). These main members are advantageously so disposed that they must be removed in the order of assembly. For instance, the oil pump 25a cannot be withdrawn before the oil casing 25 which is placed in front of it on the assembly 19, the oil casing itself uncovering the rocker cover.

FIG. 3 shows in greater detail the pneumatic device for locking the pivoting conveying device in position. The device comprises two pneumatic jacks 33 whose rods 34 act on hook 35 mounted for pivotal movement around pivots 36 connected to the overhead framework 12. The latter comprises in its lower part U-shaped chocking irons 37. By acting on the jacks 33, therefore, the upper frame 13 of the pivoting conveying device can be so raised that two parallel sides of the frame 13 are inserted inside the U-irons 37, ensuring that the pivoting conveying device is retained in position.

Clearly, a jack can also be placed in each pivoting conveying device to act so as to raise it as before. In that case the pivoting conveying device can be rotated manually through 180° around its pivot 10, as described hereinbefore, to enable the engines to be assembled.

The stellate supports 18 are adapted to be rotated around their horizontal axis by means of a gear reducer 38 actuated by a shaft 39 driven by a pneumatic motor 40 to at the same time control the rotation of the supports 18 of the four pivoting conveying devices (FIG. 2). The casings of the engines 6 are thereby pivoted, thus enabling the members to be mounted on the four main faces of the casings. In this example, in which the treatment or assembly operations are essentially manual, the individual operations are completed at the assembly station by a certain number of pneumatic tools, such as wrenches, screwdrivers, etc., suspended from a monorail above the assembly zone.

In one advantageous embodiment, depicted in FIG. 4, the floor 41 of the workshop is formed, at the treatment location of the lines 2 substantially beneath the handling elements, with a gutter 42 containing metal tank 43 adapted to receive the oil, waste and all foreign bodies. A metal grating 44 covers the tank 43 at the level of the floor 41 and enables the operator to stand above the receiving tank 43. The grating 44 can move around a hinge 45 disposed on one of the sides of the gutter 42 while the receiving tank 43 can pivot through 180° around another hinge 41 placed on the opposite side of the gutter 42. The workshop can therefore be cleaned periodically, for example, once a week, the receiving tank 43 being tipped out of the gutter 42 to pour its contents onto the workshop floor 41.

Work is preferably performed by three persons at each individual treatment station, one (C) performing the tests and grinding or running-in groups of 16 engines, eight of which were assembled by that operator and eight by another. During this time, the two other operators (A) and (B) proceed successively to assemble two more groups of eight. The operator who has carried out the tests then changes with one of the assemblers, as (A) who, after testing 16 engines will change in turn with the other assembler (B). The assembly can also be performed by two, simultaneously on each side of the assembly line, two grinding-checking stations preferably being used in that case on each line.

The number of articles simultaneously treated, in this case assembled engines, must be determined according to "mental load" — i.e., the memory and training of the operators, who are assisted in this by a suitable distribution of the members on the supporting assemblies and in the lateral distributing magazine, one member covering the accessibility of another to ensure that the former is assembled first.

The installations according to the invention are advantageous, as in the example described, in manual treatment operations, which are still the most numerous, and in which they can readily be adapted to working conditions more compatible with human nature. They are all the more applicable to most various automated or mechanical operation without involving the risk of stoppages for adjustments or damage, as in the case of the convential linear transfer production lines. An installation of this kind, which can be adapted for the most various types of manufacturing work such as, for instance, treatments, machining, assembly, demounting, etc., starting from complete, partial or zero automations, has many advantages.

The transfer operations ensuring the flow of movement of the articles to be treated are performed solely by the guided handling elements, carriages or pivoting conveying devices, which are as a rule manually operated, economically constructed in large series and can readily be adapted to the various kinds of articles to be treated. All demounting and handling of the articles on their own is therefore eliminated. The treatment operations, adaptable production rate, in dependence on the number of lines put in operation, and the stoppage of one line due to damage or absenteeism, has no effect on the other lines. Similarly, the risks of misassembly of material or human origin are divided by the number of lines in operation.

Lastly, this type of installation affords the productivity advantages of continuous transfer lines, since the assembly, demounting and resumption times are eliminated, the handling times are reduced as far as possible, and the handling means according to the invention take the place of storage means. However, the invention obviates the disadvantages of a high investment cost, lack of flexibility and undeniable monotony as regards manual operations. Nevertheless, the elementary operations are carried out in repetitve series, allowing a rapid rate of production on a limited number of members in each treatment line.

Paradoxically, therefore, in contrast with the conventional manufacturing chain installations, the result is greatly reduced investment and less space occupied on the floor, and clearly superior productivity with a reduction of rejects and improvement in quality, while at the same time the installation according to the invention can readily be adapted to fluctuations in production programs, with normal working time tables, time tables according to teams, or even flexible time tables. The invention increases the responsibility of each operator for each article assembled and tested by him, and thus gives value to his work.

I claim:

1. In a manufacturing production line of the type employing a conveyor system including a supply line for supplying work handling elements to a plurality of individual treatment stations and a discharge line for removing the work handling elements from said treatment stations, the improvement wherein said individual treatment stations each comprises:

two short parallel treatment conveyor lines connected between said supply line and said discharge line;

two work stations located one along each of said short conveyor lines and adapted to receive a plurality of said work handling elements in a first group and to retain the said first group for individual treatment of articles supported by said work handling elements;

a tests station located between said two short conveyor lines, said tests station being adapted to receive two groups of work handling elements after treatment of each of said groups one at each of said work stations and to retain said groups for testing of articles supported by said work handling elements on said two short conveyor lines;

a plurality of carriages for holding a supply of components employed in the treatment of articles supported on said work handling elements;

means mounting said carriages one adjacent each treatment conveyor line for movement parallel thereto; and a workshop floor having formed therein a gutter containing a receiving tank mounted for pivotal movement around a hinge, and a grating mounted for pivotal movement around a second hinge to cover said tank;

said two short parallel treatment conveyor lines at each treatment station being located sufficiently close together to enable the testing at said tests station of said two groups of articles thereon to be performed by a single operator placed therebetween.

2. A manufacturing production line as defined in claim 1 wherein each said short treatment conveyor line is adapted to receive and temporarily retain a third group of handling elements upstream of said work station.

3. A maufacturing production line as defined in claim 1 in which each carriage includes a number of compartmented sectors supported for pivotal movement around a vertical axis of the carriage to enable the individual sectors to be presented successively opposite said treatment conveyor lines.

4. The manufacturing production line as defined in claim 1 wherein said handling elements each comprise a horizontal shaft adapted to support at least two articles to be treated, means for rotating said horizontal shaft to facilitate the treatment of articles supported thereon, means supporting said horizontal shaft for pivotal movement around a vertical axis for successively presenting articles supported thereon at said treatment stations for successive treatment while supported on said work handling elements, and an assembly having supporting means for two sets of pieces required for the treatment of articles.

5. A method of manufacturing articles on a production line of the type employing a conveyor system including a supply line for supplying work handling elements to a plurality of individual treatment stations and a discharge line for removing the work handling elements from the discharge stations, said method comprising the steps of:

a. providing at each of said treatment stations two treatment conveyor lines connected in parallel between the supply line and the discharge line;
b. providing a work station along each conveyor line;
c. providing a tests station at each treatment station adjacent the two conveyor lines and downstream of the work stations;
d. supporting on each work handling element two articles to be treated at one of the work stations and tested at the tests station;
e. conveying to the work station on each conveyor line a plurality of the work handling elements as a group, with articles supported thereon;
f. treating the articles at one of the work stations of a treatment station by a first operator;
g. substantially simultaneously with step (f), treating the articles at the other of the work stations of the last-named treatment station by a second operator;
h. conveying said two groups of work handling elements, with treated articles thereon, to the tests station of their associated conveyor lines;
i. testing the treated articles of said two groups by said first operator at said tests station;
j. substantially simultaneously with step (h), conveying to the work station on each conveyor line a further plurality of the work handling elements as a group, with articles supported thereon;
k. substantially simultaneously with step (i), treating the articles at one of the work stations of said treatment station by a third operator;
l. substantially simultaneously with step (k), treating the articles at the other of the work stations of said treatment station by said second operator;
m. discharging work handling elements with tested articles supported thereon onto the discharge line;
n. substantially simultaneously with step (m), conveying the two groups of further work handling elements, with treated articles thereon, to the test station;
o. testing the treated articles of the last-named two groups by said second operator at said tests station;
p. substantially simultaneously with step (n), conveying to the work stations on each conveyor line an additional plurality of the work handling elements as a group, with articles supported thereon;
q. substantially simultaneously with step (o), treating the articles at one of the work stations of said treatment station by said third operator;
r. substantially simultaneously with step (q), treating the articles at the other of the work stations of said treatment station by said first operator;
s. discharging work handling elements with tested articles supported thereon onto the discharge line;
t. substantially simultaneously with step (s), conveying the two groups of additional work handling elements, with treated articles thereon, to the tests station;
u. testing the treated articles of the last-named two groups by said third operator at said tests station; and
v. repeating steps (e) through (u) with the addition between steps (g) and (h) of discharging work handling elements with tested articles supported thereon onto the discharge line.

6. The method as defined in claim 5 in which the work handling elements are conveyed as groups from the supply line to standby positions on the treatment conveyor lines upstream of the work stations to be moved therefrom as groups to the work stations upon movement of the preceding groups from the work stations to the test station.

* * * * *